US008633820B2

(12) United States Patent  
Jonsson et al.

(10) Patent No.: US 8,633,820 B2
(45) Date of Patent: Jan. 21, 2014

(54) SYSTEM AND METHOD FOR MONITORING ENSILAGE OF FODDER

(75) Inventors: Magnus Jonsson, Nora (SE); Pierre De Villiers, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 572 days.

(21) Appl. No.: 12/450,767

(22) PCT Filed: Apr. 8, 2008

(86) PCT No.: PCT/SE2008/000248
§ 371 (c)(1),
(2), (4) Date: Jan. 22, 2010

(87) PCT Pub. No.: WO2008/123819
PCT Pub. Date: Oct. 16, 2008

(65) Prior Publication Data
US 2010/0148959 A1    Jun. 17, 2010

(30) Foreign Application Priority Data

Apr. 10, 2007   (SE) ...................................... 0700866

(51) Int. Cl.
*G08B 21/00*   (2006.01)
(52) U.S. Cl.
USPC ........... 340/540; 426/531; 426/635; 426/636; 340/612; 340/622; 340/614
(58) Field of Classification Search
USPC .......................................................... 340/540
See application file for complete search history.

(56) References Cited

U.S. PATENT DOCUMENTS

| 4,184,159 A  * | 1/1980 | Andersson .................... 342/464 |
| 5,744,189 A  * | 4/1998 | Pieper ........................... 426/636 |
| 6,502,505 B1 * | 1/2003 | Yun ................................. 99/468 |
| 2005/0118703 A1* | 6/2005 | Su .............................. 435/286.1 |

FOREIGN PATENT DOCUMENTS

| DE | 43 05 638 | 9/1994 |
| EP | 0 156 176 A1 | 10/1985 |

OTHER PUBLICATIONS

R.D. Shaver, Ph.D., "Practical Application of New Forage Quality Tests", Proceedings of the 6$^{th}$ Western Dairy Management Conference, Mar. 12-14, 2003, pp. 17-26.

(Continued)

*Primary Examiner* — George Bugg
*Assistant Examiner* — Anthony D Afrifa-Kyei
(74) *Attorney, Agent, or Firm* — Young & Thompson

(57) ABSTRACT

A system for monitoring the fermentation process in connection with ensilage of fodder (1) comprises a sensor device (3) arranged in the fodder during the ensilage thereof and a monitoring device (11) operatively connected to the sensor device during the ensilage. The sensor device (3) comprises at least one sensor (3a-c) provided for repeatedly measuring the content of at least one chemical substance in the fodder, which is affected by the fermentation process. The monitoring device comprises receiving means (12) provided for receiving the repeatedly measured values of the content of the chemical substance; processing means (13) provided for comparing the repeatedly measured values with reference values of the content of the chemical substance; and notifying means (14-16) provided for notifying a farmer (17) depending on the outcome of the comparison of the repeatedly measured values and the reference values.

20 Claims, 2 Drawing Sheets

(56) References Cited

OTHER PUBLICATIONS

Bill Seglar, D.V.M., P.A.S., "Fermentation Analysis and Silage Quality Testing", From the Proceedings of the Minnesota Dairy Health Conference College of Veterinary Medicine, University of Minnesota, May 2003, pp. 119-136.

Wilkinson, et al., "History of Silage", "Silage Science and Technology", American Society of Agronomy, Inc., No. 42 in the series Agronomy, 2003, pp. 6-15.

Notice of Opposition to a European patent dated May 16, 2011 for corresponding European Patent Application No. EP 08741840.6.

* cited by examiner

SYSTEM AND METHOD FOR MONITORING ENSILAGE OF FODDER

TECHNICAL FIELD OF THE INVENTION

The present invention generally relates to dairy farming, and more specifically the invention relates to a system and to a method, respectively, for monitoring the fermentation process in connection with ensilage of fodder.

DESCRIPTION OF RELATED ART AND BACKGROUND OF THE INVENTION

Harvesting forages as silage wherein a fermentation process will preserve the crop is commonplace. Ideal fermentation is dependent upon decisions and management practices implemented before and during the ensiling process. Primary factors that should be considered by the producer include stage of maturity of the forage at harvest, type of fermentation that occurs in the fodder during the ensilage, and type of storage structure used and methods of harvesting and feeding.

During the ensiling process some enzymes are able to break down cellulose and hemicellulose to various simple sugars. Other bacteria break down simple sugars to smaller end products such as acetic, lactic and butyric acids. The most desirable end products are acetic and lactic acid.

There are a large number of factors that have influence on the fermentation process: type of crop, time of harvesting, moisture content, length of chop, silage distribution, compaction, voiding of air (oxygen), and temperature, to mention a few.

SUMMARY OF THE INVENTION

It is in this respect an object of the present invention to provide a system and a method, respectively, for monitoring the fermentation process in connection with ensilage of fodder, to thereby ensure that the resulting silage is formed in a desirable, preferably high quality, process, which e.g. follows predetermined criteria.

It is yet a further object of the invention to provide such a system and such a method, which can be fully automated.

It is still a further object to provide such a system and such a method, which are efficient, accurate, precise, flexible, fast, uncomplicated, reliable, of reasonable cost, and/or easy to implement and use.

These objects, among others, are according to the present invention attained by systems and methods as specified in the appended claims.

According to one aspect of the invention there is provided a system for monitoring the fermentation process in connection with ensilage of fodder comprising two main parts: a sensor device and a remotely located monitoring device.

The sensor device is arranged in the fodder during the ensilage thereof and comprises at least one sensor provided for repeatedly measuring the content of at least one chemical substance in the fodder, which is affected by the fermentation process.

The monitoring device is operatively connected to the sensor device during the ensilage and comprises (i) a receiver provided for receiving the repeatedly measured values of the content of the at least one chemical substance; (ii) a processor provided for comparing the repeatedly measured values with reference values of the content of the at least one chemical substance; and (iii) a device, preferably a display unit, a loudspeaker, or a transmitter, provided for notifying a farmer depending on the outcome of the comparison of the repeatedly measured values and the reference values.

Preferably, the sensor device comprises a wireless transmitter provided for transmitting the repeatedly measured values of the content of the chemical substance wirelessly to the monitoring device, and the receiver of the monitoring device is a wireless receiver in order to be capable of receiving the wirelessly transmitted values.

By such a system the farmer can be alerted when the ensiling process does not develop properly. The farmer can be immediately notified if something goes wrong in the anaerobic fermentation of the fodder.

In one embodiment of the invention, a sensor of the sensor device is provided for repeatedly measuring the content of lactic acid in the fodder during the ensilage thereof, and the notifying device is provided for informing the farmer that the fermentation process does not develop appropriately if the repeatedly measured values of the content of lactic acid in the fodder are lower than reference values of the content of lactic acid. If the content of lactic acid is not increasing as forecast the farmer will be informed and can take proper actions.

In another embodiment of the invention, a sensor of the sensor device is provided for repeatedly measuring the pH value in the fodder during the ensilage thereof, and the notifying device is provided for informing the farmer that the fermentation process does not develop appropriately if the repeatedly measured pH values are higher than reference values of the pH. If the pH is not dropping as fast as is desired the farmer will be informed and can take proper actions.

In yet another embodiment of the invention, the monitoring system comprises a plurality of the sensor device, each being arranged at a separate location in the fodder during the ensilage thereof. The monitoring device is operatively connected to each of the sensor devices during the ensilage of the fodder, wherein its receiver is provided for receiving the repeatedly measured values of the content of the chemical substance from each of the sensor devices, its processor is arranged, for each of the sensor devices, to compare the repeatedly measured values with reference values of the content of the chemical substance, and its notifying device is arranged, for each of the comparisons, to notify the farmer depending on the outcome of the comparison of the repeatedly measured values and the reference values. Preferably, the sensor devices are distributed in the fodder of a storage silo, e.g. a tower silo or a plane silo, but each of them may be located in a different silo or even in a different bale, circular bale or bale of different shape.

By this embodiment the fermentation process can be monitored more closely, i.e. it can be monitored in each of a plurality of different locations, in order to obtain information faster of local fermentation problems or shortcomings.

According to another aspect of the invention there is provided a method for monitoring the fermentation process in connection with ensilage of fodder. According to the method, the content of at least one chemical substance in the fodder is during the ensilage of the fodder repeatedly measured by a sensor device located in the fodder, wherein the content of the chemical substance is affected by the fermentation process. The repeatedly measured values of the content of the at least one chemical substance are transferred to a monitoring device and the repeatedly measured values are compared with reference values of the content of the at least one chemical substance. Finally, a farmer is notified depending on the outcome of the comparison of the repeatedly measured values and the reference values.

Further characteristics of the invention, and advantages thereof, will be evident from the following detailed description of preferred embodiments of the present invention given hereinafter and the accompanying FIGS. 1-2, which are given by way of illustration only, and thus are not limitative of the present invention.

DETAILED DESCRIPTION OF EMBODIMENTS

Figure 1:
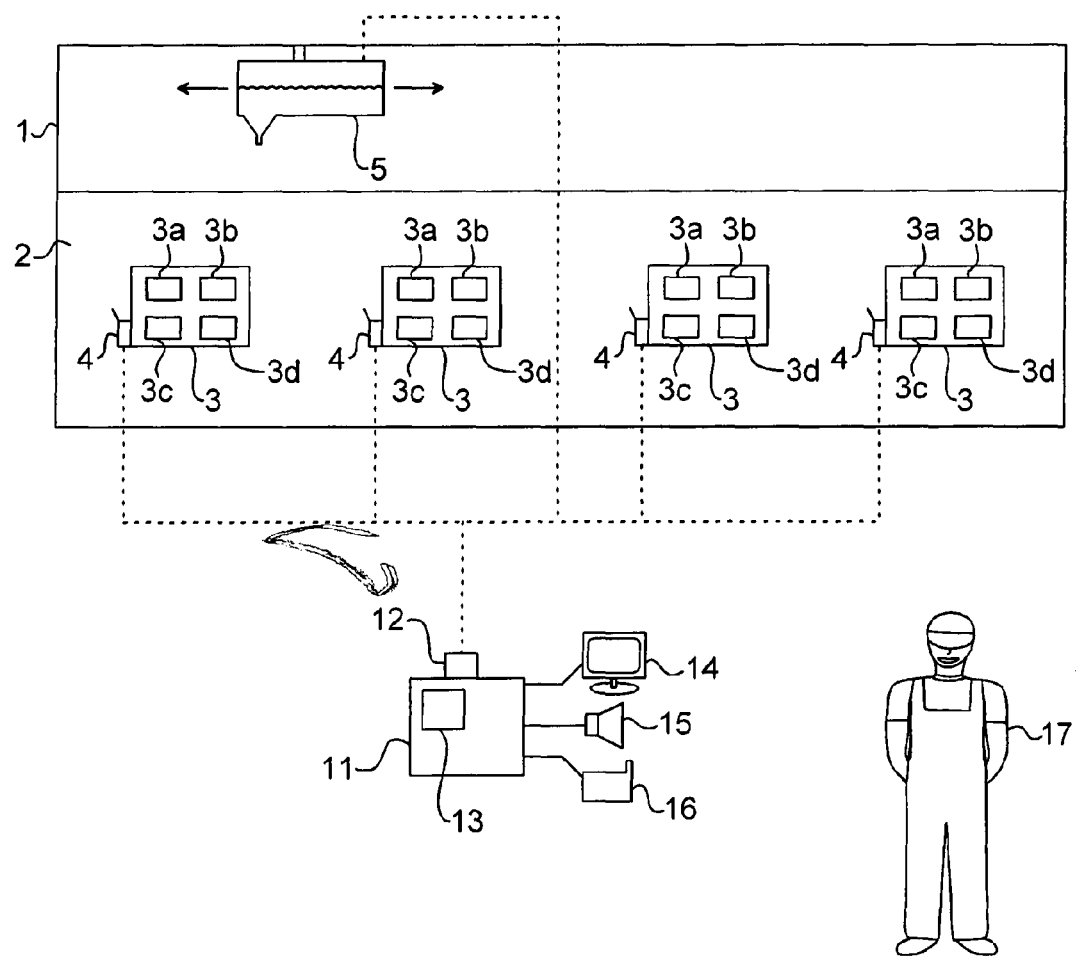
FIG. 1 displays schematically in a block diagram a monitoring system according to an embodiment of the present invention.

Reference numeral 1 denotes a storage silo with animal feed or fodder 2 which is being ensiled. Ensilage is a fermentation process of preserving green food for cattle in an undried condition in a pit for holding the fodder, from which air has been, as far as possible, excluded. The fodder which is the result of the ensiling process is called silage. Crops suitable for ensilage are grasses, clovers, alfalfa, vetches, oats, rye, and maize.

Typically, the raw fodder 2 is disintegrated in a chopper apparatus to facilitate packing of the fodder. The packing is used to minimize the risk of oxygen entering the fodder and determines the nature of the resulting silage. To further enhance the chances of achieving a successful ensiling process additives, which lower the pH, counteract undesired microorganisms or promote the lactic acid bacteria, may be added to the fodder. Nevertheless, the ensiling process may be affected in many unfavorable manners.

The present invention provides therefore a system for monitoring the fermentation process in connection with the ensilage of fodder 2 in e.g. the storage silo 1. The monitoring system comprises at least one sensor device 3 arranged in the fodder 2 during the ensilage thereof. In the illustrated embodiment four sensor devices 3 are arranged at different locations in the fodder 2 to sense the fodder at four different positions since the fermentation process may develop quite differently at different places in the storage silo. Obviously, there may be more or fewer sensor devices 3 present in the fodder 2.

Alternatively, the sensor devices 3 are located in different storage silos, e.g. tower or plane silos, or several sensor devices 3 are located at different locations in each of a plurality of storage silos.

If the fodder, on the other hand, is ensiled in a large number of bales, the sensor devices 3 may be distributed among the bales, e.g. a sensor device 3 may be arranged in every tenth or twentieth bale.

Each of the sensor devices 3 includes at least one sensor device provided for repeatedly measuring the content of at least one chemical substance in the fodder during the ensilage thereof, wherein the content of the chemical substance is affected by the fermentation process. In the illustrated embodiment three different sensors 3a-c are provided for repeatedly measuring the content of three different chemical substances separately. For instance, a first sensor 3a may be provided for repeatedly measuring the content of lactic acid in the fodder, a second sensor 3b may be provided for repeatedly measuring the content of $H^+$ or $H_3O^+$ ions, i.e. a pH value, in the fodder, and a third sensor 3a may be provided for repeatedly measuring the content of amino or ammonium compounds or acetate compounds in the fodder. A fourth sensor 3d is provided for repeatedly measuring a temperature in the fodder. It shall be appreciated that each of the sensor devices 3 may comprise a single sensor only, two sensors, three sensors or more than four sensors in alternative embodiments. Yet alternatively, the sensor devices may comprise different sensors.

Sensors for measuring fermentation parameters (acetic acid, lactic acid, ammonia, etc) in grass and corn silage are known in the art. Measurements of the content of lactic acid, amino and ammonium compounds, and acetate compounds in silage can be performed by e.g. near infrared spectroscopy (NIR). A field-adopted NIR instrument is therefore advantageously used. A large variety of sensors known in the art can be used for measuring pH and temperature.

Alternatively, or additionally, each of the sensor devices 3 may be arranged to repeatedly measure the contents of carbon dioxide, oxygen, acetic acid and/or butyric acid in the fodder during the ensilage.

Each of the sensor devices 3 is operatively connectable to a monitoring device 11 for transmitting the repeatedly measured values by the sensors 3a-d of the respective sensor device. The operative connection may be via cable, but is preferably a wireless connection. To this end, each of the sensor devices may be provided with a respective wireless transmitter 4 provided for wirelessly transmitting repeatedly measured values to the monitoring device 11. Furthermore, the monitoring device is provided with a wireless receiver 12 provided for wirelessly receiving the repeatedly measured values as transmitted by each of the sensor devices 3.

The monitoring device 11 further comprises a processing device or microcomputer 13 provided for comparing the repeatedly measured values as received from each of the sensor devices 3 with corresponding reference values, i.e. the repeatedly measured contents of lactic acid in the fodder are compared with reference values of the content of lactic acid, the repeatedly measured pH values in the fodder are compared with reference values of the pH value, the repeatedly measured contents of other compounds in the fodder are compared with reference values of the content of that compound, and the repeatedly measured temperatures in the fodder are compared with reference values of the temperature. It shall be appreciated that the reference values may change during the measurements. They may for instance depend on time of ensilage or depend on earlier values they have taken.

The monitoring device 11 further comprises a notifying device, e.g. a display unit 14, a loudspeaker 15, or a transmitter 16, provided for notifying a farmer 17 depending on the outcome of the comparison of the repeatedly measured values and the reference values. Typically, the notifying device is arranged to notify the farmer if the repeatedly measured values deviate too much from what is considered to be good or normal.

The notification may be accompanied with information of the identity and/or location of the sensor device 3 that has transmitted the repeatedly measured values which cause the notification, and optionally with information of how the repeatedly measured values deviate from the reference values, in order for the farmer 17 to take appropriate actions such as e.g. interrupting the ensilage, changing the composition of the fodder, changing the packing intensity, chopping the fodder further, adding one or several additives, changing the pH in the fodder, changing the temperature in the fodder, sealing any leakages, etc. depending on the cause to the deviation.

Further, the monitoring system of the invention may comprise a device 5 connectable to the monitoring device 11 and provided for performing an operation in connection with the ensilage of the fodder depending on the outcome of the comparison of the repeatedly measured values and the reference values. The device 5 may be movable above the fodder, e.g.

along a rail or similar in the ceiling of the storage silo 1, and may connect wirelessly to the monitoring device 11 and receive instructions from the processing device 13 thereof. To this end the wireless receiver 12 of the monitoring device may be exchanged for a wireless transceiver.

Preferably, the device 5 for performing an operation is a device suitable for adding an additive, preferably acid (lactic or formic acid) or sugar, a conditioner, a preservative, and/or bacteria to the fodder depending on the outcome of the comparison of the repeatedly measured values from the sensor devices 3 and the reference values. The additives, conditioners, preservatives and bacteria may add nutrients to the silage, add dry matter to reduce moisture content, add water to increase moisture content, alter rate, amount and kind of acid production, promote the growth of lactic acid bacteria, culture silage (inoculants) to stimulate acid production, acidify the silage, and/or counteract growth of undesired microorganisms.

Alternatively, or additionally, a device is provided for automatically packing the fodder denser and/or a device is provided for automatically chopping the fodder further depending on the outcome of the above comparison.

These devices are preferably arranged to perform the respective operation of the fodder that surrounds or is closely located to the sensor device 3, which has transmitted the repeatedly measured values, which cause the operation.

Preferably but not necessarily the monitoring system of the present invention is fully automated.

Figure 2:
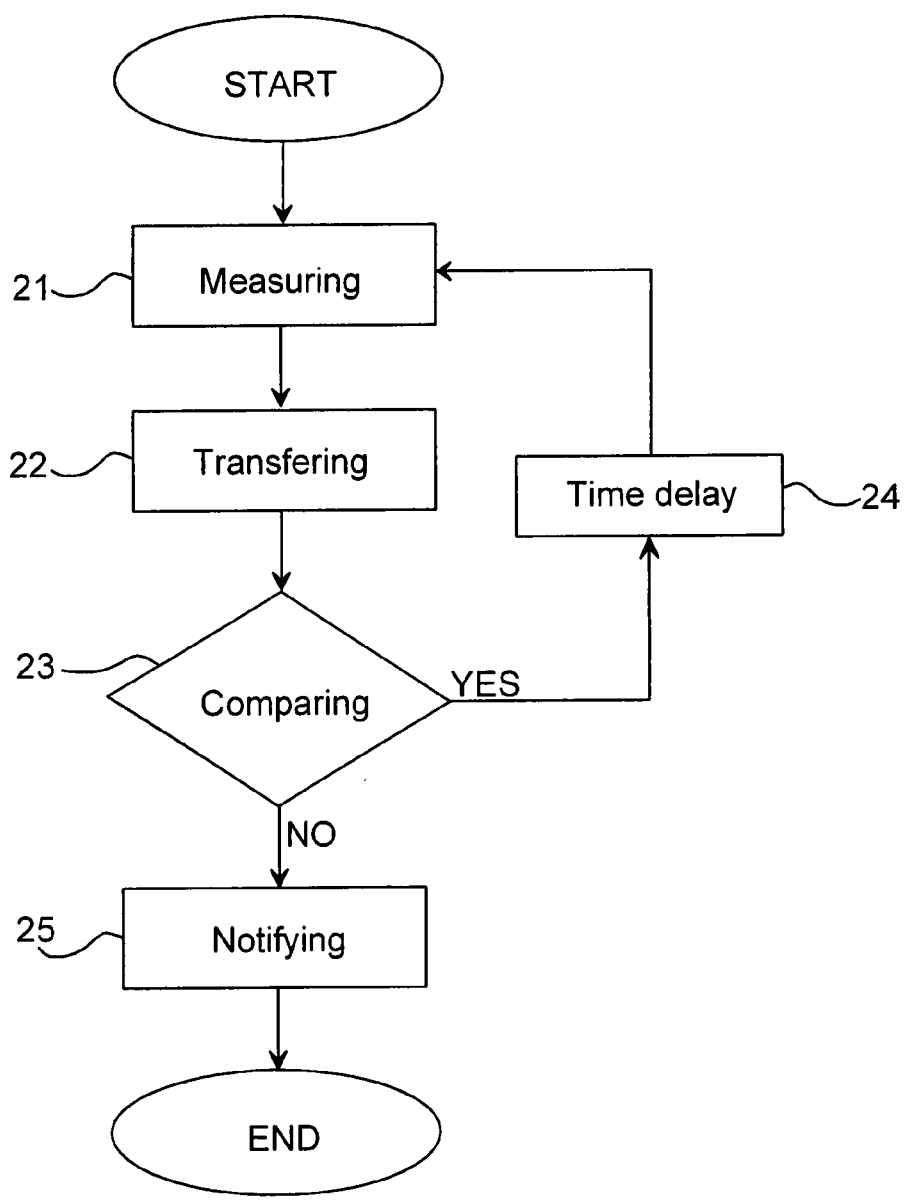
FIG. 2 is a schematic flow diagram of a monitoring method according to an embodiment of the present invention.

With reference next to FIG. 2 a method for monitoring the fermentation process in connection with ensilage of fodder according to an embodiment of the invention will be shortly overviewed. The method starts, in a step 21, by measuring, during the ensilage of the fodder, the content of a chemical substance in the fodder by one of the sensor devices 3 located in the fodder, wherein the content of the chemical substance is affected by the fermentation process. The measured value is then, in a step 22, transferred to the monitoring device 11. The measured value is next, in a step 23, compared with a reference value of the content of the chemical substance. If the measured value $V_{means}$ fulfills some specified criterion with respect to the reference value $V_{ref}$, e.g. if $$|V_{mean} - V_{ref}| < Dev_{max}$$

where $Dev_{max}$ is a maximum allowed deviation, the fermentation process is determined to progress appropriately, and the monitoring method is returned to step 21 after a time delay step 25. Steps 21-24 form a closed loop that is running as long as the above equation is fulfilled. Note, however, that the reference value $V_{ref}$ and the maximum allowed deviation $Dev_{max}$ may not be constants, but functions of time or functions depending on their earlier values and/or on earlier values of the measured value.

As soon as the above equation is not fulfilled, the method continues, in a step 25, by notifying the farmer 17 of the fact, and the method is ended.

The above equation should merely be seen as an example. In the general case the repeatedly measured values are compared with reference values according to any specified criterion.

In one variant of the monitoring method the content of lactic acid in the fodder is measured in the step 21 and the reference value is given as a minimum allowed content of lactic acid. In step 23 it is checked whether the measured content of lactic acid is at least the minimum allowed content of lactic acid and if the answer is affirmative the method is returned to step 21 via step 24. If the answer is negative, the farmer is informed in the step 25 that the fermentation process does not develop appropriately, i.e. that the measured content of lactic acid in the fodder is too low. Hereby, a predetermined increase of the content of lactic acid in the fodder can be ensured or the farmer is immediately notified and can take proper actions.

In another variant of the monitoring method the pH in the fodder is measured in the step 21 and the reference value is given as a maximum allowed pH value. In step 23 it is checked whether the measured pH is not above the maximum allowed pH value and if the answer is affirmative the method is returned to step 21 via step 24. If the answer is negative, that is the measured pH is above the maximum allowed pH value, the farmer is informed in the step 25 that the fermentation process does not develop appropriately, i.e. that the measured pH in the fodder is too high. Hereby, a fast drop of the pH in the fodder can be ensured or the farmer is immediately notified and can take proper actions.

It shall be appreciated that the above embodiments, variants and versions of the invention may readily be combined in a plurality of manners to reach yet further embodiments, variants and versions of the invention.

The invention claimed is:

1. A system for monitoring a fermentation process in connection with ensilage of fodder in a storage silo or bale, the system comprising:
    a sensor device arranged in said fodder in one of i) a storage silo, and ii) a bale during the ensilage thereof,
    the sensor device comprising at least three different sensors (3a-c) for repeatedly making sensor measurements, at a common location, including of a content of at least two different chemical substances separately during the ensilage in the fodder within the one of i) the storage silo, and ii) the bale, the content of the at least two different substances, each substance being affected by the fermentation process; and
    a monitoring device operatively connected to said sensor device during the ensilage, the monitor device comprising
    i) a receiving unit arranged to receive the repeatedly measured values,
    ii) a processing unit arranged to compare the repeatedly measured values with reference values to determine if a difference of the measured values and the reference values are within a maximum allowed deviation, and
    iii) a notifying unit arranged to notify a farmer based on an outcome of the comparison of the repeatedly measured values and the reference values exceeds the maximum allowed deviation,
    wherein the reference values are changed over time as a function of one of i) a duration of the ensilage of the fodder and ii) earlier measured values of the at least two chemical substances taken by the three different sensors of the sensor device.

2. The system of claim 1, wherein the sensor device comprises a wireless transmitter arranged to transmit the repeatedly measured values of the content of the at least two chemical substances wirelessly to the monitoring device, and the reference values changing over time as a function of the earlier measured values taken by the three different sensors of the sensor device.

3. The system of claim 1, wherein the two different chemical substances include at least two from the group consisting of i) a content of lactic acid in the fodder, ii) a content of a pH value in the fodder, and iii) a content of one of amino compounds, ammonium compounds, and acetate compounds in the fodder.

4. The system of claim 3, wherein one of said three different sensors (3a-c) is arranged to measure a temperature at the location in the fodder.

5. The system of claim 1, wherein one of said three different sensors (3a-c) is arranged to measure a temperature at the location in the fodder.

6. The system of claim 3, wherein said notifying unit is arranged for informing the farmer that the fermentation process does not develop appropriately when the repeatedly measured pH values are higher than reference values of the pH.

7. The system of claim 1, wherein
the two different chemical substances include at least two from the group consisting of i) a content of lactic acid in the fodder, ii) a content of a pH value in the fodder, iii) carbon dioxide in the fodder, and iv) a content of oxygen in the fodder.

8. The system of claim 1, wherein,
one of said sensors is arranged for repeatedly measuring a temperature in said fodder, at said location,
the receiving unit is arranged to receive the repeatedly measured values of the temperature,
the processing unit is arranged to compare the repeatedly measured values of the temperature with reference values of the temperature, and
the notifying unit is arranged to notify the farmer based on an outcome of the comparison of the repeatedly measured values of the temperature and the reference values of the temperature.

9. The system of claim 1, further comprising:
a device connected to said monitoring device and arranged to perform an operation in connection with the ensilage of said fodder based on the outcome of the comparison of the repeatedly measured values and the reference values.

10. The system of claim 1, wherein said system comprises a plurality of the sensor device, each sensor device being arranged at a separate location in said fodder within the one of i) the storage silo, and ii) the bale, during the ensilage thereof.

11. The system of claim 1, wherein the reference values change over time as a function of the duration of the ensilage of the fodder.

12. A method for monitoring the fermentation process in connection with ensilage of fodder in a storage silo or bale, the method comprising the steps of:
with a sensor device located in one of i) a storage silo, and ii) a bale, repeatedly measuring, during the ensilage of the fodder within the one of i) the storage silo, and ii) the bale, a content of at least one chemical substance in the fodder by a sensor device located in said fodder, wherein the content of said chemical substance is affected by said fermentation process during the ensilage of the fodder;
transferring the repeatedly measured values of the content of the at least one chemical substance to a monitoring device;
with the monitoring device, comparing the repeatedly measured values with reference values of the content of the at least one chemical substance to determine if a difference of the measured values and the reference values are within a maximum allowed deviation; and
notifying a farmer based on the outcome of the comparison of the repeatedly measured values and the reference values exceeding the maximum allowed deviation, wherein the reference values are changed over time as a function of one of i) a duration of the ensilage of the fodder, and ii) earlier measured values of the chemical substance taken by the sensor device.

13. The method of claim 12, wherein the maximum allow deviation is changed as one of i) a function of time, and ii) a function of earlier measured values of the chemical substance taken by the sensor device.

14. The method of claim 12, wherein the content of lactic acid in said fodder is measured repeatedly by the sensor device.

15. The method of claim 12, wherein the maximum allow deviation is changed as a function of earlier measured values of the chemical substance taken by the sensor device.

16. The method of claim 12 wherein the pH value in said fodder is repeatedly measured by the sensor device, and the farmer is informed that the fermentation process does not develop appropriately when the repeatedly measured pH values are higher than reference values of the pH value.

17. The method of claim 12, wherein,
the sensor device comprises at least three different sensors (3a-c) repeatedly measuring, at a common location,
a first sensor (3a) of the three sensors is arranged to measure a pH value in the fodder,
a second sensor (3b) of the three sensors is arranged to measure a content of lactic acid in the fodder, and
a third sensor (3c) of the three sensors is arranged to measure temperature in the fodder over time during the ensilage of the fodder.

18. The method of claim 12, wherein the reference values are changed over time as a function of the duration of the ensilage of the fodder.

19. The method of claim 12, wherein the reference values are changed over time as a function of the earlier measured values of the chemical substance taken by the sensor device.

20. The method of claim 12, wherein plural of the sensor device are located at plural locations with the one of i) the storage silo, and ii) the bale, repeatedly measuring, during the ensilage of the fodder, the content of at least one chemical substance in the fodder.

* * * * *

UNITED STATES PATENT AND TRADEMARK OFFICE
CERTIFICATE OF CORRECTION

PATENT NO. : 8,633,820 B2  Page 1 of 1
APPLICATION NO. : 12/450767
DATED : January 21, 2014
INVENTOR(S) : Jonsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
Twenty-second Day of September, 2015

Michelle K. Lee
*Director of the United States Patent and Trademark Office*